(12) United States Patent
Suzuki et al.

(10) Patent No.: US 12,195,077 B2
(45) Date of Patent: Jan. 14, 2025

(54) STEERING COLUMN DEVICE

(71) Applicant: JTEKT CORPORATION, Kariya (JP)

(72) Inventors: Takuya Suzuki, Kashihara (JP);
Hiroyuki Asakura, Hamamatsu (JP);
Yuka Ikeda, Hamamatsu (JP); Kanki Doi, Kosai (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 18/562,540

(22) PCT Filed: Jun. 25, 2021

(86) PCT No.: PCT/JP2021/024245
§ 371 (c)(1),
(2) Date: Nov. 20, 2023

(87) PCT Pub. No.: WO2022/269932
PCT Pub. Date: Dec. 29, 2022

(65) Prior Publication Data
US 2024/0239400 A1    Jul. 18, 2024

(51) Int. Cl.
*B62D 1/185*    (2006.01)
(52) U.S. Cl.
CPC ................... *B62D 1/185* (2013.01)
(58) Field of Classification Search
CPC ........ B62D 1/185; B62D 1/183; B62D 1/187; B62D 1/19
See application file for complete search history.

(56) References Cited

U.S. PATENT DOCUMENTS

| | | |
|---|---|---|
| 2011/0041643 A1 | 2/2011 | Watanabe |
| 2015/0069745 A1 | 3/2015 | Iwakawa et al. |
| 2015/0075316 A1 | 3/2015 | Iwakawa et al. |
| 2015/0090067 A1 | 4/2015 | Iwakawa et al. |
| 2017/0167532 A1 | 6/2017 | Arasaki |
| 2018/0086362 A1 | 3/2018 | Sakayanagi et al. |

FOREIGN PATENT DOCUMENTS

| | | | | |
|---|---|---|---|---|
| CN | 109501852 A | * | 3/2019 | ............ B62D 1/181 |
| EP | 3299253 A1 | * | 3/2018 | ............ B62D 1/181 |
| FR | 3103445 A1 | * | 5/2021 | ............ B62D 1/181 |
| JP | 2001-315649 A | | 11/2001 | |

(Continued)

OTHER PUBLICATIONS

Dupont, FR-3103445-A1, Machine Translation of Specification (Year: 2021).*

(Continued)

*Primary Examiner* — Paul N Dickson
*Assistant Examiner* — Matthew Joseph Ganci
(74) *Attorney, Agent, or Firm* — Oliff PLC

(57) ABSTRACT

A steering column device includes a column shaft to which a steering wheel is fixed, and a steering column that rotatably supports the column shaft. The steering column includes a housing that is configured to be supported by a vehicle body, a column tube that is accommodated in the housing so as to be movable in an axial direction, and a contact pad that is disposed between the housing and the column tube. The contact pad is fixed to the column tube, and is also configured to press against the housing from an inner side.

5 Claims, 4 Drawing Sheets

(56) References Cited

FOREIGN PATENT DOCUMENTS

| JP | 2005-280654 A | 10/2005 |
| JP | 2015-227166 A | 12/2015 |
| JP | 2018-052208 A | 4/2018 |

OTHER PUBLICATIONS

Chen, CN-109501852-A, Machine Translation of Specification (Year: 2019).*
Jul. 27, 2021 Search Report issued in International Patent Application No. PCT/JP2021/024245.
Jul. 18, 2024 Office Action issued in European Patent Application No. 21947211.5.
Jul. 18, 2024 Extended Search Report issued in European Patent Application No. 21947211.5.

* cited by examiner

STEERING COLUMN DEVICE

TECHNICAL FIELD

The present disclosure relates to a steering column device.

BACKGROUND ART

Conventionally, there is a steering column device that is capable of adjusting a position of a steering wheel in a front-rear direction of a vehicle (hereinafter referred to as telescopic position). Generally, this type of steering column device includes a housing supported by a vehicle body, a column tube accommodated within the housing so as to be movable in an axial direction, and a column shaft rotatably supported within the column tube.

In such a steering column device, the column tube is movable in the axial direction, and accordingly there is a slight clearance that is present between the housing and the column tube. Accordingly, when an external force acts on the steering wheel due to driver operations, for example, backlash of the column tube may occur. Therefore, Patent Document 1, for example, discloses a steering column device including a pressing mechanism that is disposed between a housing and a column tube. In this steering column device, the column tube is pressed inward in the radial direction by the pressing mechanism, thereby suppressing backlash of the column tube within the housing.

RELATED ART DOCUMENTS

Patent Documents

Patent Document 1: Japanese Unexamined Patent Application Publication No. 2018-52208 (JP 2018-52208 A)

SUMMARY OF THE INVENTION

Problem to be Solved by the Invention

In the steering column device according to Patent Document 1 above, the pressing mechanism is fixed to the housing. Accordingly, when the column tube moves in the axial direction as the telescopic position is adjusted, the relative position between the pressing mechanism and the column tube changes, and the point of load of pressing force acting on the column tube changes. That is to say, distance between the point of load of the pressing force and the steering wheel changes depending on the telescopic position. As a result, the column tube tends to exhibit backlash depending on the telescopic position. This tendency becomes more pronounced the greater an adjustable range of the telescopic position is.

Means for Solving the Problem

A steering column device according to an aspect of the present disclosure includes a column shaft to which a steering wheel is fixed, and a steering column that rotatably supports the column shaft. The steering column includes a housing that is supported by a vehicle body, a column tube that is accommodated in the housing so as to be movable in an axial direction, and a contact pad that is disposed between the housing and the column tube. The contact pad is fixed to the column tube, and also is configured to press against the housing from an inner side.

MODES FOR CARRYING OUT THE INVENTION

An embodiment of a steering column device will be described below with reference to the drawings.

(Overall Configuration)

The steering column device 1 is installed in a vehicle so as to generally extend in a front-rear direction of the vehicle. In the following description, a left far side in FIG. 1 is a front side of the vehicle, a right near side in FIG. 1 is a rear side of the vehicle, and orientations expressed in terms such as "front", "rear", "up", "down", "left", "right", and so forth, are defined with respect to the vehicle.

Figure 1:
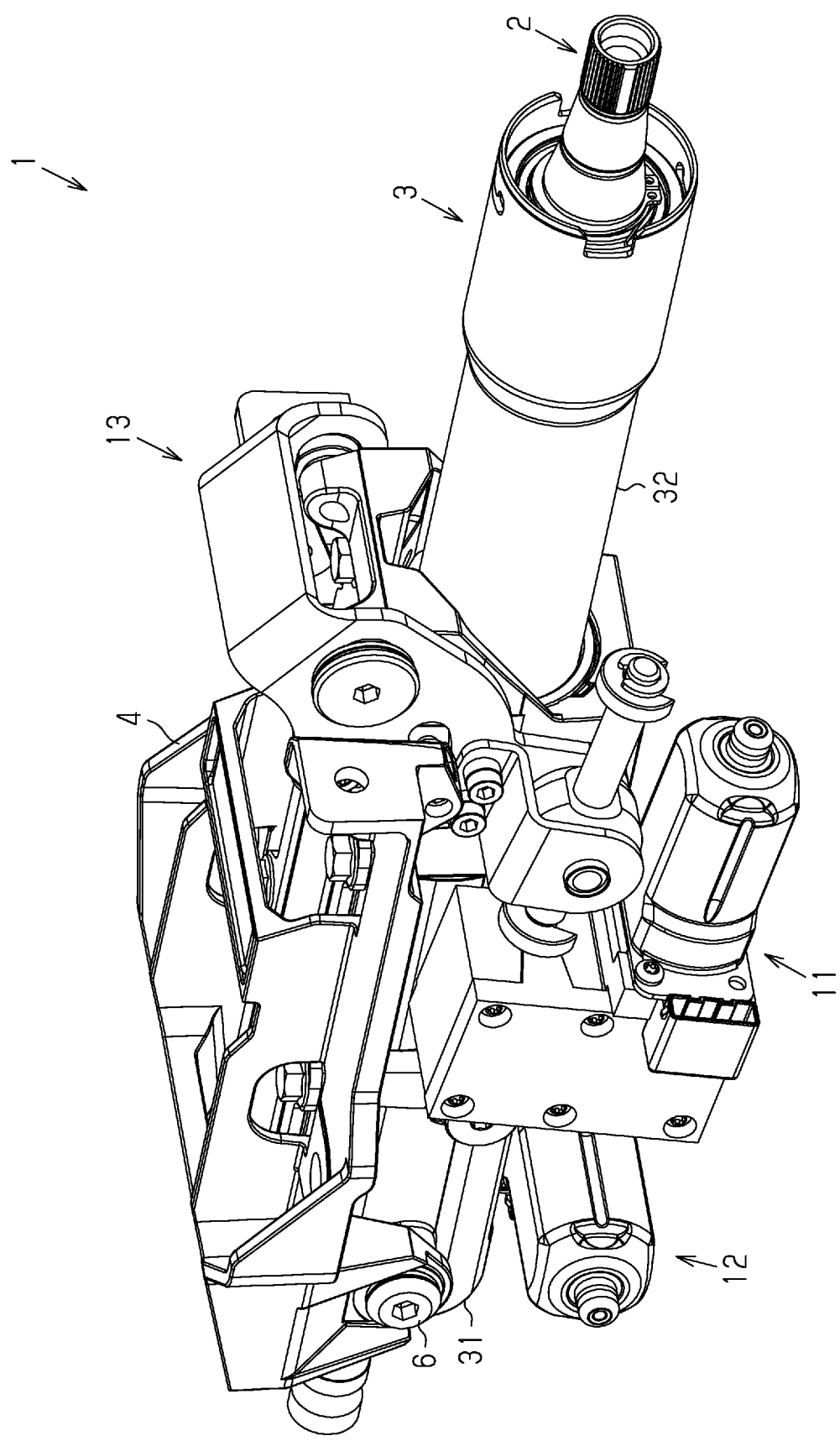
FIG. 1 is a perspective view of a steering column device according to an embodiment.
Figure 2:
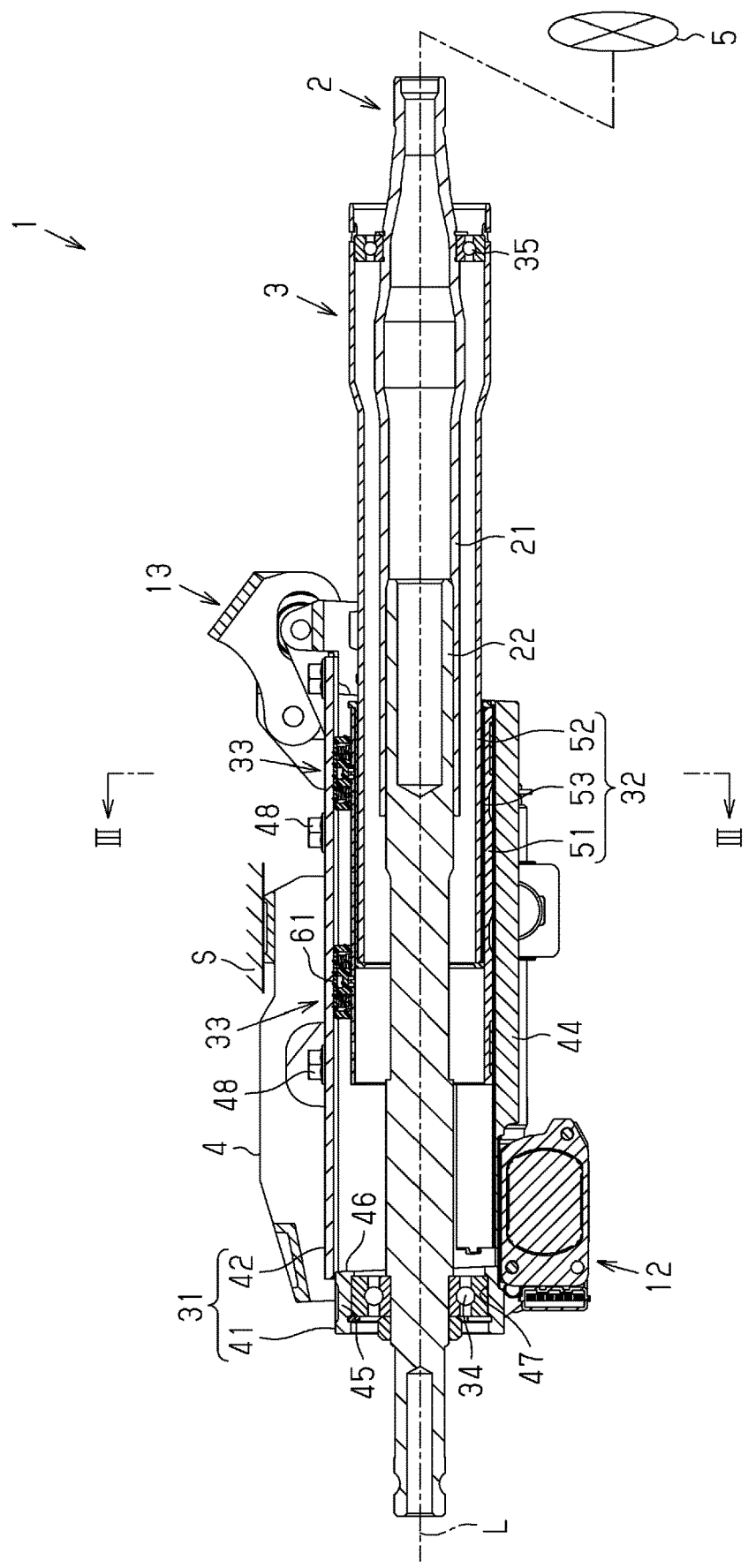
FIG. 2 is a sectional view of the steering column device in FIG. 1, taken along an axial direction.

As illustrated in FIG. 1 and FIG. 2, the steering column device 1 includes a column shaft 2, a steering column 3 that rotatably accommodates the column shaft 2, and a bracket 4 that couples the steering column 3 with a vehicle body S. The column shaft 2 and the steering column 3 are disposed on a common axial line L.

A steering wheel 5 is coupled with a rear-side end portion of the column shaft 2. An intermediate shaft, omitted from illustration, is coupled with a front-side end portion of the column shaft 2. The intermediate shaft is coupled with steered wheels via a rack and pinion mechanism that is omitted from illustration. The bracket 4 is coupled with the steering column 3 using a hinge bolt 6. The steering column 3 is capable of pivoting about the hinge bolt 6, in a state of being supported by the vehicle body S via the bracket 4.

The steering column device 1 is configured such that a position of the steering wheel 5 in an up-down direction (hereinafter referred to as tilt position) and position of the steering wheel 5 in the front-rear direction (hereinafter referred to as telescopic position) can be adjusted. The tilt position is adjusted by pivoting the steering column 3 about the hinge bolt 6. The telescopic position is adjusted by telescoping of the steering column 3.

The steering column device 1 includes a tilt actuator 11 configured to pivot the steering column 3 about the hinge bolt 6, and a telescopic actuator 12 configured to perform telescoping of the steering column 3. The tilt actuator 11 pivots the steering column 3 via a link mechanism 13 to change the tilt position within a tilt adjustment range that is set in advance. The telescopic actuator 12 changes the telescopic position by performing telescoping of the steering column 3 within a telescopic adjustment range that is set in advance. As an example, the telescopic adjustment range is set to a large range, such that the steering wheel 5 can be retracted to a position where it is out of the way of a driver when the vehicle is in an automated driving mode, for example.

Next, a structure for enabling adjustment of the telescopic position will be described.

(Column Shaft 2)

As illustrated in FIG. 2, the column shaft 2 includes an upper shaft 21 and a lower shaft 22. The upper shaft 21 has an elongated cylindrical shape. The steering wheel 5 is coupled with a rear-side end portion of the upper shaft 21. The lower shaft 22 has an elongated columnar shape. The lower shaft 22 is fitted to an inner peripheral portion of the upper shaft 21 through a spline engagement. Accordingly, the lower shaft 22 is coupled with the upper shaft 21 so as to be rotatable integrally with the upper shaft 21 and to be movable in an axial direction relative to the upper shaft 21. Note that it is sufficient for an arrangement to be capable of being regarded as a cylindrical shape as a whole to fall under the term "cylindrical shape" as used in the present specification, which includes a cylindrical shape formed by combining a plurality of parts, and a shape that is formed by partially notching out into a C-shaped part or the like.

(Steering Column 3)

Figure 3:
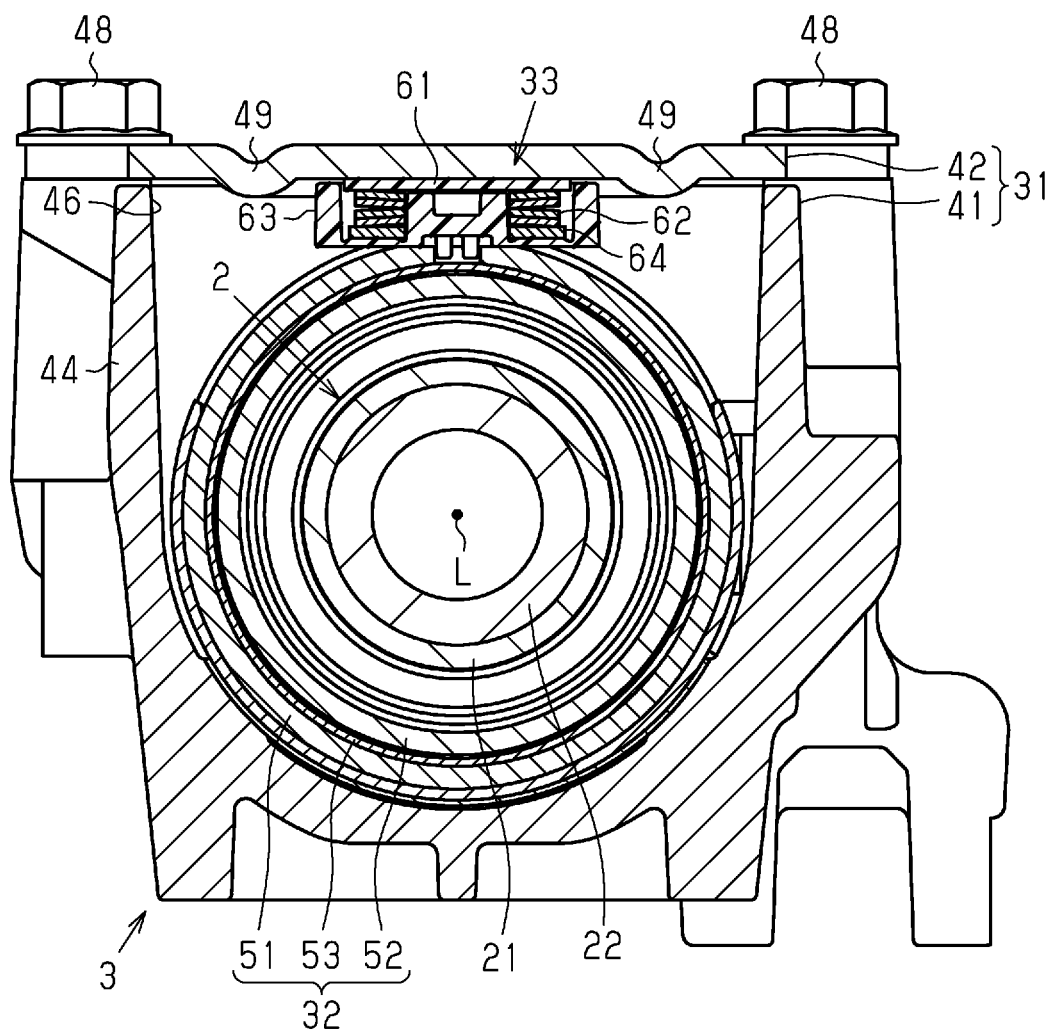
FIG. 3 is a cross-section of the steering column device in FIG. 1 orthogonal to the axial direction, and is a cross-sectional view taken along line III-III in FIG. 2.

As illustrated in FIG. 2 and FIG. 3, the steering column 3 includes a housing 31, a column tube 32, and a plurality of pressing mechanisms 33. As an example, the steering column 3 includes two pressing mechanisms 33, but the number of the pressing mechanisms 33 may be one, or three or more. Note that in FIG. 3, members other than the column shaft 2 and the steering column 3 are omitted from illustration, for convenience of description.

The housing 31 has a generally square-tube shape. The housing 31 is coupled with the vehicle body S via the bracket 4. The housing 31 rotatably supports the lower shaft 22 via a bearing 34 provided at a front-side end portion thereof so as to be immovable relative thereto in the axial direction. The column tube 32 has a cylindrical shape. The column tube 32 rotatably supports the upper shaft 21 via a bearing 35 provided at a rear-side end portion thereof so as to be immovable relative thereto in the axial direction. This enables the column tube 32 to move integrally with the upper shaft 21 in the axial direction. The column tube 32 is accommodated in the housing 31 so as to be movable in the axial direction. The telescopic actuator 12 is coupled with the column tube 32 so as to be capable of moving the column tube 32 in the axial direction. The pressing mechanisms 33 are disposed between the housing 31 and the column tube 32. The pressing mechanisms 33 are fixed to the column tube 32, and also are configured to press against the housing 31 from an inner side thereof.

Movement of the column tube 32 in the housing 31 in the axial direction causes the steering column 3 to telescope. At this time, the upper shaft 21 moves in the axial direction with respect to the lower shaft 22 as the column tube 32 moves, and accordingly the column shaft 2 telescopes, and the telescopic position of the steering wheel 5 changes.

The configurations of the housing 31, the column tube 32, and the pressing mechanism 33 will be described in detail below.

(Housing 31)

The housing 31 includes a housing main body 41 and a cover 42. In one example, the housing main body 41 has a substantially square-tube outer shape. The housing main body 41 has a peripheral wall 44, and an end wall 45 provided at a front-side end portion of the peripheral wall 44. The peripheral wall 44 has an opening 46 that opens on an upper side. The opening 46 is rectangular, and opens generally the entire upper-side portion of the peripheral wall 44. The peripheral wall 44 has a lower-side portion, a left-side portion, and a right-side portion, and a cross-section thereof that is orthogonal to the axial direction of the peripheral wall 44 is generally U-shaped. The end wall 45 has a through hole 47 extending therethrough in the axial direction. The bearing 34 is provided in the through hole 47.

The cover 42 has a rectangular plate shape. The cover 42 covers, generally the entire opening 46. The cover 42 is fixed to the housing main body 41 using a plurality of fixing bolts 48. The cover 42 has two ribs 49 that extend in the axial direction. The ribs 49 extend over the entire region of the cover 42 in the axial direction. The two ribs 49 are provided spaced apart from each other in a width direction of the vehicle. The ribs 49 are formed by bending a part of the cover 42 so as to protrude downward. Note that the ribs 49 are sometimes referred to as rails. A portion of an inner face of the cover 42 between the ribs 49, i.e., a portion of the inner face of the cover 42 that is in contact with a contact pad 61, which will be described later, is flat and continues uninterrupted over the entire region of the cover 42 in the axial direction.

(Column Tube 32)

The column tube 32 includes an outer tube 51, an inner tube 52 and a sleeve 53. The outer tube 51, the inner tube 52 and the sleeve 53 all have cylindrical shapes. The outer tube 51 is disposed on a front side from the inner tube 52. As an example, the outer tube 51 may have a length in the axial direction with which the outer tube 51 does not protrude to the rear side from the housing 31 in a state in which the steering wheel 5 is adjusted to an optional telescopic position. A rear-side end portion of the inner tube 52 protrudes from the housing 31. The bearing 35 is provided at the rear-side end portion of the inner tube 52. A front-side end portion of the inner tube 52 is fitted to an inner periphery of a rear-side end portion of the outer tube 51. The sleeve 53 is interposed between the outer tube 51 and the inner tube 52.

A part of an outer periphery of the outer tube 51 is clinched toward the inner tube 52. Thus, the outer tube 51, the inner tube 52, and the sleeve 53 move integrally in the axial direction when the telescopic position of the steering wheel 5 is being adjusted. On the other hand, when an impact load due to a vehicle collision or the like, for example, acts upon the steering wheel 5, the inner tube 52 deforms the sleeve 53 and also moves in the axial direction with respect to the outer tube 51, thereby absorbing the impact load.

Figure 4:
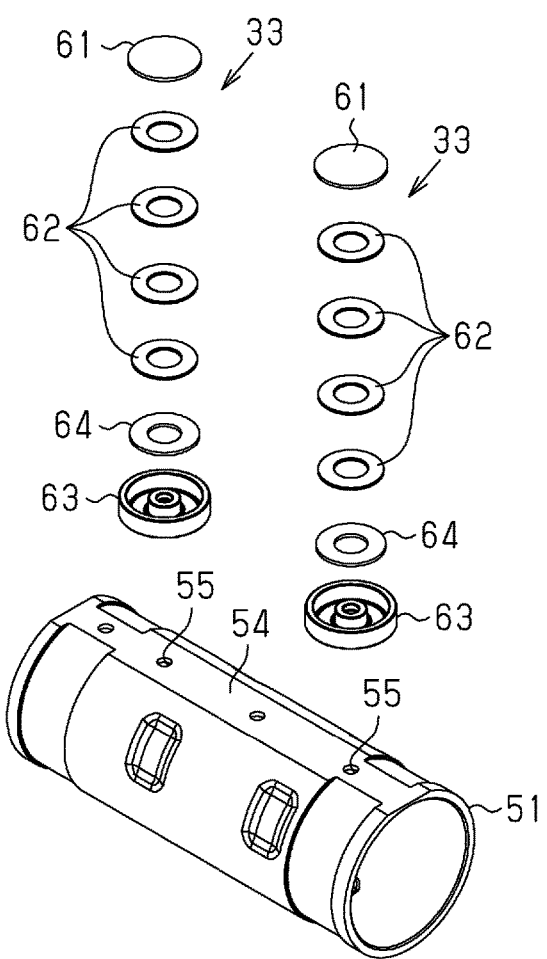
FIG. 4 is a disassembled perspective view of an outer tube and a pressing mechanism included in the steering column device in FIG. 1.

As illustrated in FIG. 4, an outer peripheral face of the outer tube 51 has a flat portion 54. The flat portion 54 is provided on an upper-side portion of the outer peripheral face of the outer tube 51, and is provided over the entire region of the outer tube 51 in the axial direction. The outer tube 51 has a plurality of attaching holes 55 that are opened in the flat portion 54. The attaching holes 55 are provided arrayed in the axial direction.

(Pressing Mechanism 33)

As illustrated in FIG. 2, the pressing mechanisms 33 are disposed on the outer periphery of the outer tube 51 with a spacing therebetween in the axial direction. Specifically, one of the pressing mechanisms 33 is disposed on a rear side from a middle position of the outer tube 51 in the axial direction, and the other is disposed on a front side from the middle position of the outer tube 51 in the axial direction. These pressing mechanisms 33 are configured in the same way, and accordingly the pressing mechanism 33 that is disposed on the rear side will be described, and description of the pressing mechanism 33 disposed on the front side will be omitted.

Figure 5:
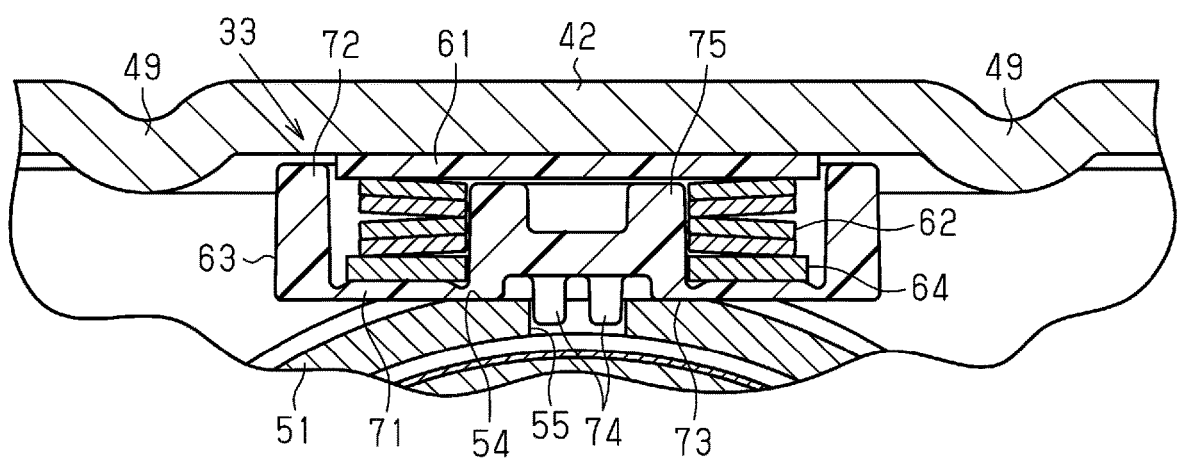
FIG. 5 is an enlarged cross-sectional view of a vicinity of the pressing mechanism in FIG. 3.

As illustrated in FIG. 3 to FIG. 5, the pressing mechanism 33 includes a contact pad 61, an elastic member 62, and a holder 63. Further, the pressing mechanism 33 includes a washer 64 that is ring-shaped. The holder 63 is fixed to the outer peripheral face of the outer tube 51, and accommodates the contact pad 61 and the elastic member 62. That is to say, the contact pad 61 and the elastic member 62 are fixed to the outer tube 51, i.e., to the column tube 32, via the holder 63. The elastic member 62 biases the contact pad 61 toward the inner face of the housing 31. The contact pad 61 presses the housing 31 from the inside thereof using the biasing force of the elastic member 62.

Specifically, the holder 63 has a short cylindrical outer shape of which one end is closed off. The holder 63 is made of a resin material, as one example. Specifically, the holder 63 has a bottom wall 71 that is disk-shaped, and a peripheral wall 72 that has a cylindrical shape. An outside diameter of the peripheral wall 72 is smaller than a spacing between the ribs 49 on the cover 42. An outer-side face of the bottom wall 71 has an installation face 73 that is flat. The middle of the outer-side face of the bottom wall 71 is recessed, and the installation face 73 has an annular shape. The holder 63 also has a plurality of protrusions 74 protruding from the middle of the outer-side face of the bottom wall 71 and a single support base 75 protruding from the middle of an inner-side face of the bottom wall 71. Each protrusion 74 protrudes outside of the holder 63 to a greater extent than the installation face 73. The protrusions 74 are disposed at equiangular intervals around the axial line of the holder 63. The holder 63 is fixed to the outer peripheral face of the outer tube 51 by bringing the installation face 73 into contact with the flat portion 54 of the outer tube 51, and press-fitting the protrusions 74 into the attaching holes 55. The holder 63 is disposed between the ribs 49 in a state of being fixed to the outer peripheral face of the outer tube 51. The support base 75 has a columnar shape. The height of the support base 75 is lower than that of the peripheral wall 72.

A bore diameter of the washer 64 is slightly larger than an outside diameter of the support base 75 and smaller than a bore diameter of the peripheral wall 72. The washer 64 is disposed on the bottom wall 71 while in a state of being fitted on an outer periphery of the support base 75.

The elastic member 62 is a ring-shaped member. A bore diameter of the elastic member 62 is slightly larger than the outside diameter of the support base 75, and smaller than the bore diameter of the peripheral wall 72. For the elastic member 62, a stack of a plurality of disc springs is used as one example, but may be a coil spring or the like. The elastic member 62 is disposed upon the washer 64 in a state of being fitted to the outer periphery of the support base 75.

The contact pad 61 is a member that is thin and disc-shaped. In one example, the contact pad 61 is made of a resin material that has a low coefficient of friction and excellent sliding properties. An outside diameter of the contact pad 61 is smaller than the bore diameter of the peripheral wall 72. That is to say, the washer 64, the elastic member 62, and the contact pad 61 are accommodated in the holder 63 in this order. The contact pad 61 is disposed within the peripheral wall 44 in a state of being in contact upon a distal end face of the support base 75. A thickness of the contact pad 61 is greater than a difference between an amount of protrusion of the peripheral wall 44 and an amount of protrusion of the support base 75. Thus, the contact pad 61 protrudes from a distal end face of the peripheral wall 72 in a state of being in contact with the distal end face of the support base 75, and is in contact with a flat portion on the inner face of the cover 42, between the ribs 49. Note that the contact pad 61 may be referred to as a slide plate.

In the pressing mechanism 33 configured as described above, the contact pad 61 presses the inner face of the cover 42 from an inner side thereof in the radial direction toward an outer side thereof, using the biasing force of the elastic member 62. The column tube 32 is pressed in the radial direction by a reaction force of the contact pad 61 pressing the cover 42. This suppresses backlash of the column tube 32 within the housing 31. Also, when adjusting the telescopic position of the steering wheel 5, the contact pad 61 slides in the axial direction while in a state of being in contact with the inner face of the cover 42.

Next, the functions and effects of the present embodiment will be described.

(1) The steering column device 1 includes the column shaft 2 to which the steering wheel 5 is fixed, and the steering column 3 that rotatably supports the column shaft 2. The steering column 3 includes the housing 31 supported by the vehicle body S, the column tube 32 accommodated in the housing 31 so as to be movable in the axial direction, and the pressing mechanisms 33 disposed between the housing 31 and the column tube 32. The pressing mechanisms 33 are fixed to the column tube 32, and also are configured to press against the housing 31 from the inner side thereof. The pressing mechanisms 33 have the contact pads 61 that come into contact with the housing 31.

In the above configuration, the contact pads 61 are fixed to the column tube 32, and accordingly the positions of the contact pads 61 as to the column tube 32 do not change even when the telescopic position of the steering wheel 5 changes. That is to say, the distance between the point of load of the pressing force acting on the column tube 32 and the steering wheel 5 does not change in accordance with the telescopic position. Accordingly, when an external force is applied to the steering wheel 5 by an operation performed by the driver, for example, backlash of the column tube 32 can be stably reduced, regardless of the telescopic position.

Also, the pressing force of the pressing mechanisms 33 can always be applied at an optimum position for reducing backlash of the column tube 32. Accordingly, the pressing force acting on the housing 31 can be suppressed from becoming excessive, and frictional force acting between the housing 31 and the contact pads 61 can be reduced. As a result, the load applied to the telescopic actuator 12 when adjusting the telescopic position can be reduced.

(2) The pressing mechanisms 33 further include the elastic members 62 that bias the contact pads 61 toward the housing 31. According to the above configuration, the contact pads 61 press against the housing 31 from the inner side thereof, using the biasing force of the elastic members 62. Accordingly, the force by which the contact pads 61 press against the housing 31, i.e., the magnitude of the pressing force acting upon the column tube 32, can be suppressed from varying due to dimensional deviation of the component members of the steering column device 1.

(3) The pressing mechanisms 33 further include the holders 63 that are fixed to an outer peripheral face of the column tube 32, and that also accommodate the contact pads 61 and the elastic members 62. According to the above configuration, the contact pads 61 and the elastic members 62 can easily be integrally fixed to the column tube 32.

(4) The outer peripheral face of the column tube 32 includes the flat portion 54. The holders 63 have installation faces 73 that are flat and that come into contact with the flat portion 54. According to the above configuration, the holders 63 can be stably fixed to the outer peripheral face of the column tube 32. Thus, the force by which the contact pads 61 press against the housing 31 can be stabilized.

(5) The housing 31 has the housing main body 41 with the peripheral wall 44 that has the opening 46 passing therethrough in the radial direction, and the cover 42 that closes off the opening 46. The contact pads 61 are in contact with the inner face of the cover 42.

Regarding procedures for assembling the steering column 3, in the above configuration, the column tube 32 is first inserted into an inner side of the housing main body 41, for example, and then the pressing mechanisms 33 are fixed to the column tube 32 through the opening 46. Thereafter, the steering column 3 is assembled by attaching the cover 42. Accordingly, the steering column 3 can be assembled more easily than when the column tube 32 with the pressing mechanisms 33 in a state of being fixed thereto, for example, is inserted into the housing 31 from the rear side in the axial direction.

(6) The holder 63 has the bottom wall 71, the peripheral wall 72, and the support base 75 projecting from the bottom wall 71 in the same direction as the peripheral wall 72. The contact pad 61 protrudes from the distal end face of the peripheral wall 72 in a state of being in contact with the distal end face of the support base 75. According to the above configuration, members other than the contact pad 61, such as the peripheral wall 72 of the holder 63 and so forth, can be suppressed from coming into contact with the cover 42, for example, when vibration or the like is applied externally. Further, providing the support base 75 enables movement of the elastic member 62 and the washer 64 in the radial direction due to external vibration to be restricted, and accordingly variance in pressing force can be suppressed.

(7) The cover 42 has two ribs 49 extending in the axial direction, and these ribs 49 are provided spaced apart from each other in the vehicle width direction. The contact pad 61 is in contact with the flat portion between the ribs 49 on the inner face of the cover 42. According to the above configuration, strength of the cover 42 can be improved by the ribs 49. Further, the contact pads 61 can be suppressed from sliding in a direction deviating from the axial line L when adjusting the telescopic position.

The present embodiment can be carried out modified as follows. The above embodiment and the following modifications can be combined insofar as no technical contradiction arises.

In the above-described embodiment, the entire cover 42 may have a flat shape, without the ribs 49 being provided on the cover 42.

In the above-described embodiment, a configuration may be made in which the housing main body 41 does not have the opening 46 and the housing 31 does not include the cover 42.

In the above-described embodiment, the shape of the holder 63 can be changed as appropriate, as long as the contact pad 61 and the elastic member 62 can be accommodated. For example, the holder 63 may be configured without having the support base 75. Also, the holder 63 may be configured having a single protrusion that is press-fitted into the attaching hole 55, instead of the multiple protrusions 74. Further, the holder 63 may be configured without having the protrusions 74. In this case, the holder 63 may be fixed to the outer tube 51 by an appropriate method, such as screws, adhesive agent, or the like, for example.

In the above embodiment, the column tube 32 does not have to have the flat portion 54. Also, the holder 63 does not have to have the installation face 73 that is flat.

In the above embodiment, the inner tube 52 may be directly fitted to an inner periphery of the outer tube 51, without the column tube 32 including the sleeve 53.

In the above embodiment, the pressing mechanism 33 does not have to include the washer 64. Also, the pressing mechanism 33 does not have to include the elastic member 62. Further, the pressing mechanism 33 may be made up of just the contact pad 61, without having the elastic member 62, the washer 64 and the holder 63. In this case, the contact pad 61 may press against the housing 31 by, for example, the thickness of the contact pad 61 being set such that the contact pad 61 is compressed between the housing 31 and the column tube 32.

In the above-described embodiment, the steering column device 1 is configured to adjust the tilt position and the telescopic position by being electrically driven, but this is not restrictive, and a configuration may be made in which at least one of the tilt position and the telescopic position is manually adjusted. Alternatively, the steering column device 1 may be configured such that only the telescopic position can be adjusted.

The invention claimed is:

1. A steering column device, comprising:
a column shaft to which a steering wheel is fixed; and
a steering column that rotatably supports the column shaft, wherein:
the steering column includes
a housing that is configured to be supported by a vehicle body,
a column tube that is accommodated in the housing so as to be movable in an axial direction, and
a contact pad that is disposed between the housing and the column tube; and
the contact pad is fixed to the column tube such that the contact pad is configured to not move in the axial direction relative to the column tube, and the contact pad is also configured to press against the housing from an inner side.

2. The steering column device according to claim 1, further comprising an elastic member that biases the contact pad toward the housing.

3. The steering column device according to claim 2, further comprising a holder that is fixed to an outer peripheral face of the column tube, and that accommodates the contact pad and the elastic member.

4. The steering column device according to claim 3, wherein:
the outer peripheral face of the column tube includes a flat portion; and
the holder includes an installation face that is flat and that comes into contact with the flat portion.

5. The steering column device according to claim 1, wherein:
the housing includes
a housing main body that includes a peripheral wall with an opening passing through in a radial direction, and
a cover that closes off the opening; and
the contact pad comes into contact with an inner face of the cover.

* * * * *